United States Patent
Renz

(10) Patent No.: US 6,560,279 B1
(45) Date of Patent: May 6, 2003

(54) TWO WIRE MULTIPLEX DATA ACQUISITION SYSTEM WITH REMOTE UNIT MODE CONTROLS

(76) Inventor: John F. Renz, 402 Ivystone La., Cinnaminson, NJ (US) 08077

( * ) Notice: Subject to any disclaimer, the term of this patent is extended or adjusted under 35 U.S.C. 154(b) by 0 days.

(21) Appl. No.: 09/425,941

(22) Filed: Oct. 25, 1999

(51) Int. Cl.[7] ............................................. H03K 7/00
(52) U.S. Cl. ........................ 375/237; 375/238; 375/220; 340/825.63
(58) Field of Search ................................ 375/211, 212, 375/214, 219, 220, 221, 238, 237; 340/870.18, 870.19, 870.23, 870.24, 601, 825.57, 825.63, 825.65

(56) References Cited

U.S. PATENT DOCUMENTS

| | | | | |
|---|---|---|---|---|
| 4,088,985 A | * | 5/1978 | Saito et al. ................ | 340/605 |
| 4,322,849 A | * | 3/1982 | Calabrese ................. | 178/70 R |
| 4,782,330 A | | 11/1988 | Tindall et al. | |

* cited by examiner

*Primary Examiner*—Don N. Vo
(74) *Attorney, Agent, or Firm*—Norman E. Lehrer

(57) ABSTRACT

A data acquisition system that utilizes a two wire network having a plurality of randomly located remote units connected to a central unit which is adapted to transfer voltage values to and from the remote units. A pulsewidth and pulse count protocol is employed that allows remote unit mode control, addressing each of the remote units for transferring sensor voltage inputs or control voltage outputs, and maintenance of network synchronization. The system does not require special wire type or routing constraints, provides automatic calibration means at the sensor location, allows multi-sensor inputs as well as multi-control voltage outputs, provides power to remote unit electronics, and provides electrical power for sensor operation utilizing the two wire network.

9 Claims, 4 Drawing Sheets

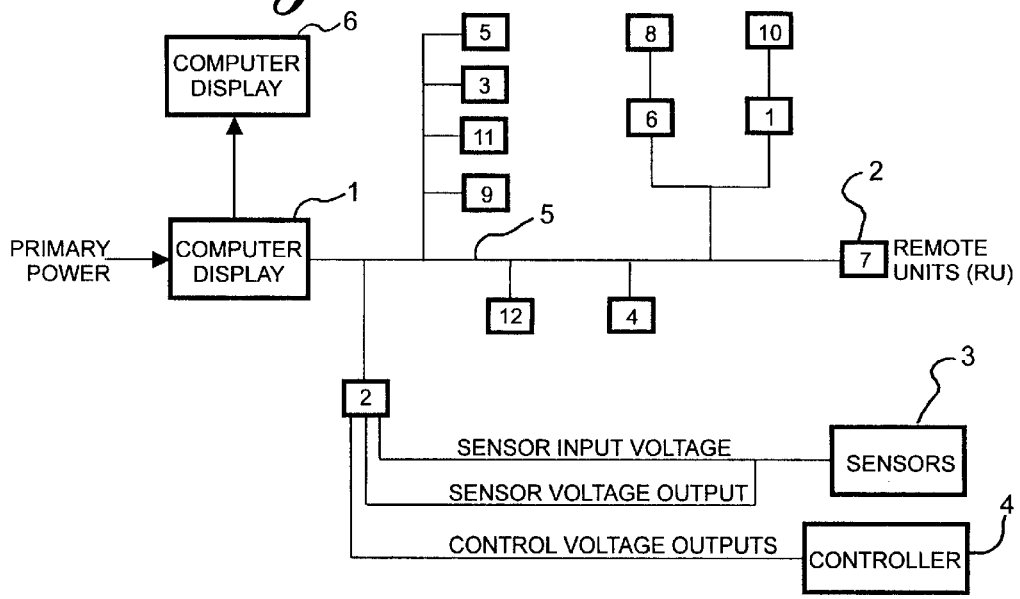

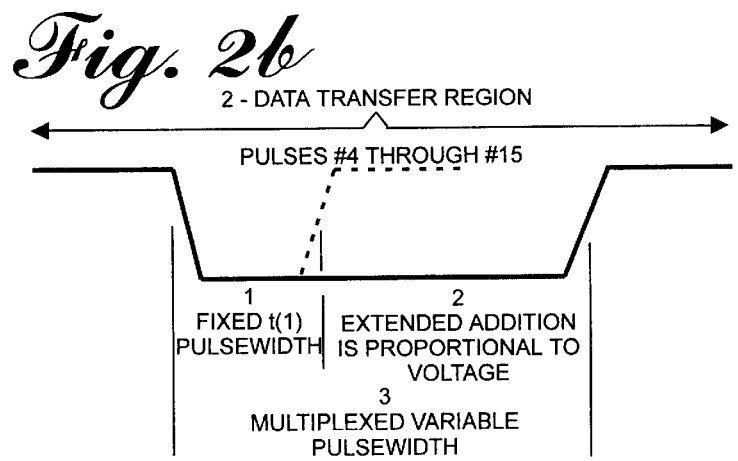
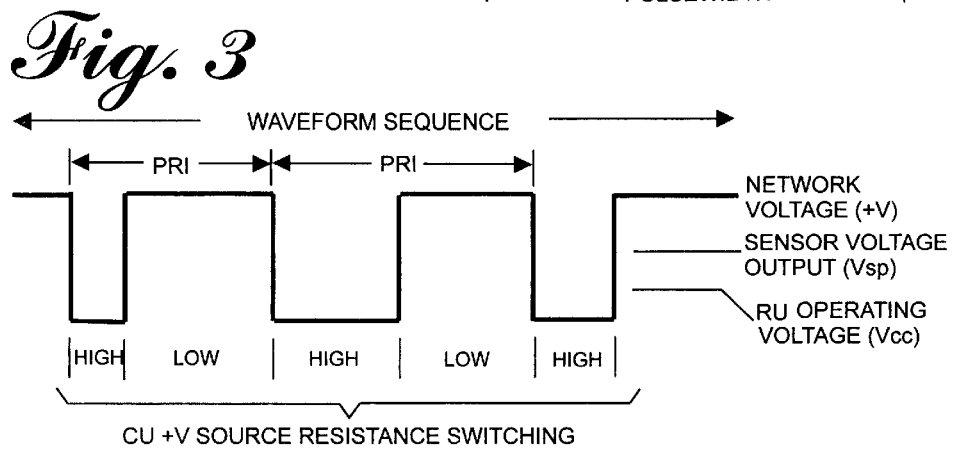
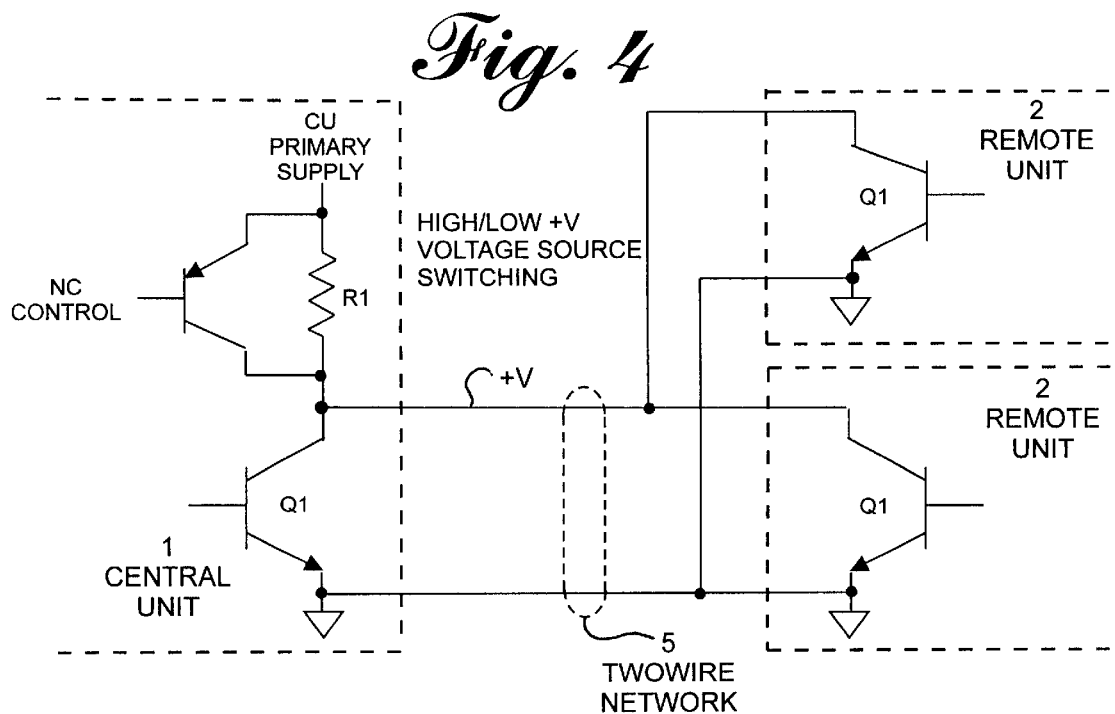

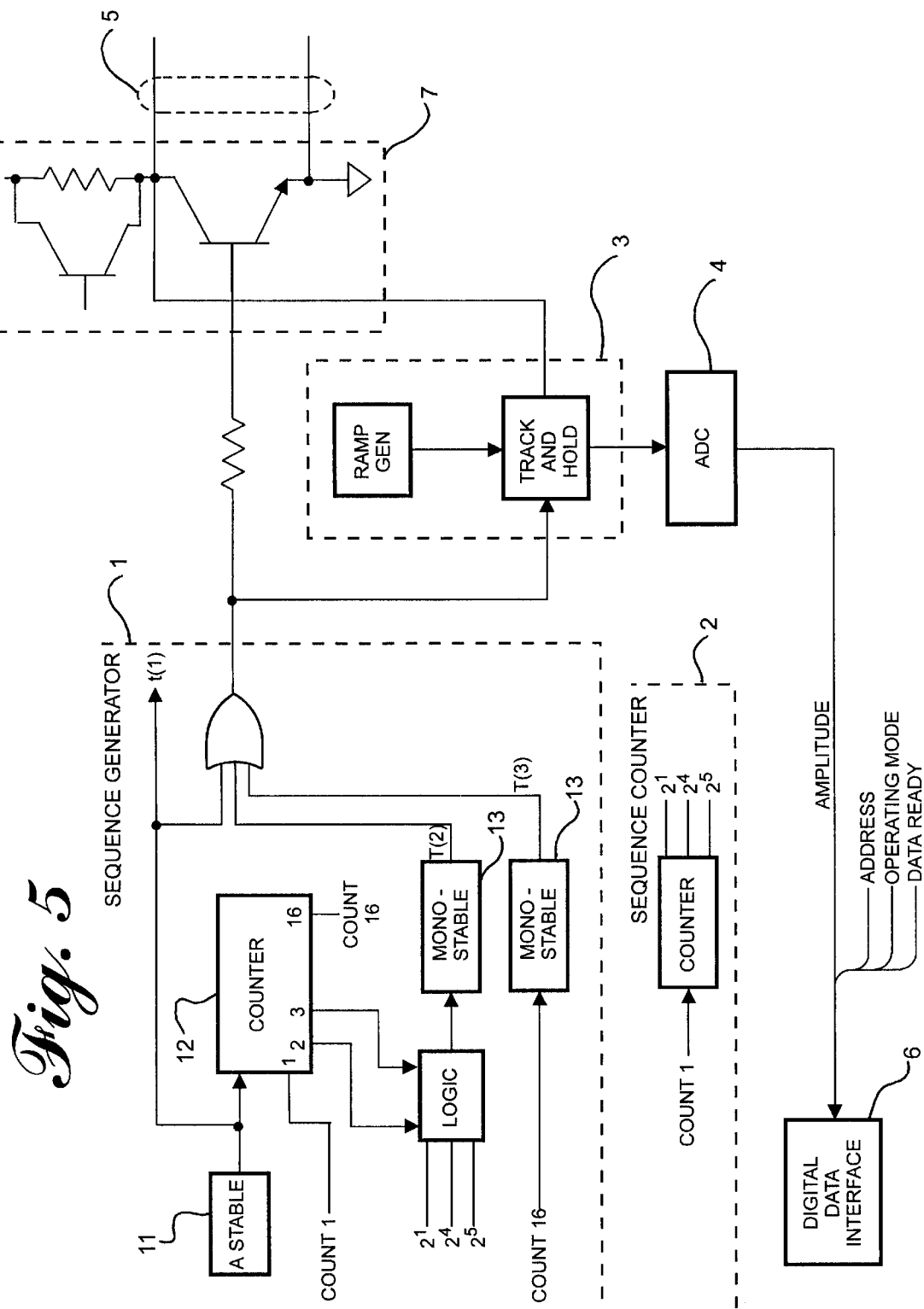

TWO WIRE MULTIPLEX DATA ACQUISITION SYSTEM WITH REMOTE UNIT MODE CONTROLS

FIELD OF THE INVENTION

This invention concerns data acquisition systems where the data sources are spatially spread over an area and it is necessary to collect, manipulate, and display the data for monitor or control purposes at a central location. Specifically, this invention addresses the practical issues related to wiring from the sensors to the central location and providing power to operate the remote electronics and sensors used for measurement.

The system wiring and remote power issues are common in large areas or buildings where the sensors are distant and electrical power may not be readily available. Examples of this are industrial process control, environmental monitoring, and proprietary alarm systems. In these cases, the cost and complexity of system wiring and sensor power are primary project issues.

BACKGROUND OF INVENTION

Present day computing power allows manipulation, organization, and display of large quantities of data at a central location. Because of the ease and efficiency of manipulating and displaying collected data, there is a growing need to collect and process ever increasing amounts. If the data to be collected is spatially spread and randomly located some distance from the central location, then the overriding issue becomes how to collect and get the data to the central location.

There are various methods of accomplishing the collection task that range from individually wired sensors to the central location to use of data busses (eg: RS232, 485) to reduce the wiring requirement. All of these require either intensive wiring, special types of wire (cable or 4 conductor), special routing, or individual sensor wiring to a network nodal point where the sensors are clustered for individual wiring to the nodal point for bus interfacing. Many of these require external power at the sensors, nodal points, or both. This can require AC availability, DC power supplies, and possibly battery backup throughout the data collection network.

Other hybrid methods of accomplishing data collection exist that power the nodal points by simply adding another wire for ground and one for voltage which results in a four wire network. Since one of the wires is ground, two are used for signaling and share a common ground with the power return. This adaptation has the limitation of adding signal and power currents in a common ground that restricts practical use because of electrical losses. Individual nodal or remote unit power current is much larger than signal current and the effect of these losses is further exacerbated at the central unit where the summation of all network power loops produce the highest offsets to signaling levels.

As a practical issue, given that the sensors are spatially spread and the object is to simplify and reduce wiring, it is important that the network not require special wire type or routing rules and that the cluster level is small. Although such systems allow a large number of sensors, the wiring efficiency is quickly lost due to the nature of random sensor location using special routing with high cluster levels. Clearly, a lower level of clustering, for example 1 or 2, with self contained power and no routing rules is more efficient than a higher cluster level, for example 8 or 16, that requires external power and special routing. Further, system failures such as loss of a clustering or nodal device have a larger system effect. Additional complications surface if the central location is moved or if central location redundancy is a reliability requirement.

Multiplex systems all require remote random location of nodal points or remote units as described by this invention to reduce wiring. However, this implies different environments at the nodal points or remote units that will cause measurement variations from the different locations for the same input voltage. Examples of these error sources are climatic environment, operating voltages, linearity differences, and aging. A practical system must incorporate a means of routinely calibrating measurements at the point where they are taken in order to calibrate measurements from that point for a satisfactory degree of system measurement accuracy.

Synchronization loss can occur from network transients caused by power surges, intermittents, and static electricity among other things. If synchronization is lost, the system must recover to avoid network contention and report correct data. This ability requires the use of a synchronization technique that is integral to each sequence of the network routine and global in that it overrides all network activity and configures all network devices to a known starting state.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 illustrates the network connection for a data acquisition and control system incorporating the present invention;

FIG. 2 is a waveform diagram of the network protocol of the central unit (CU) and remote unit (RU);

FIG. 2A is a waveform diagram detailing the system operating mode region of the waveform sequence;

FIG. 2B is a waveform diagram detailing the data transfer region of the waveform sequence;

FIG. 3 is a diagram of the voltage architecture of the waveform sequence;

FIG. 4 is a block diagram of the central unit (CU) and remote unit (RU) interface with the two wire network;

FIG. 5 is a block diagram of the central unit (CU), and

DETAILED DESCRIPTION OF THE INVENTION

Figure 6:
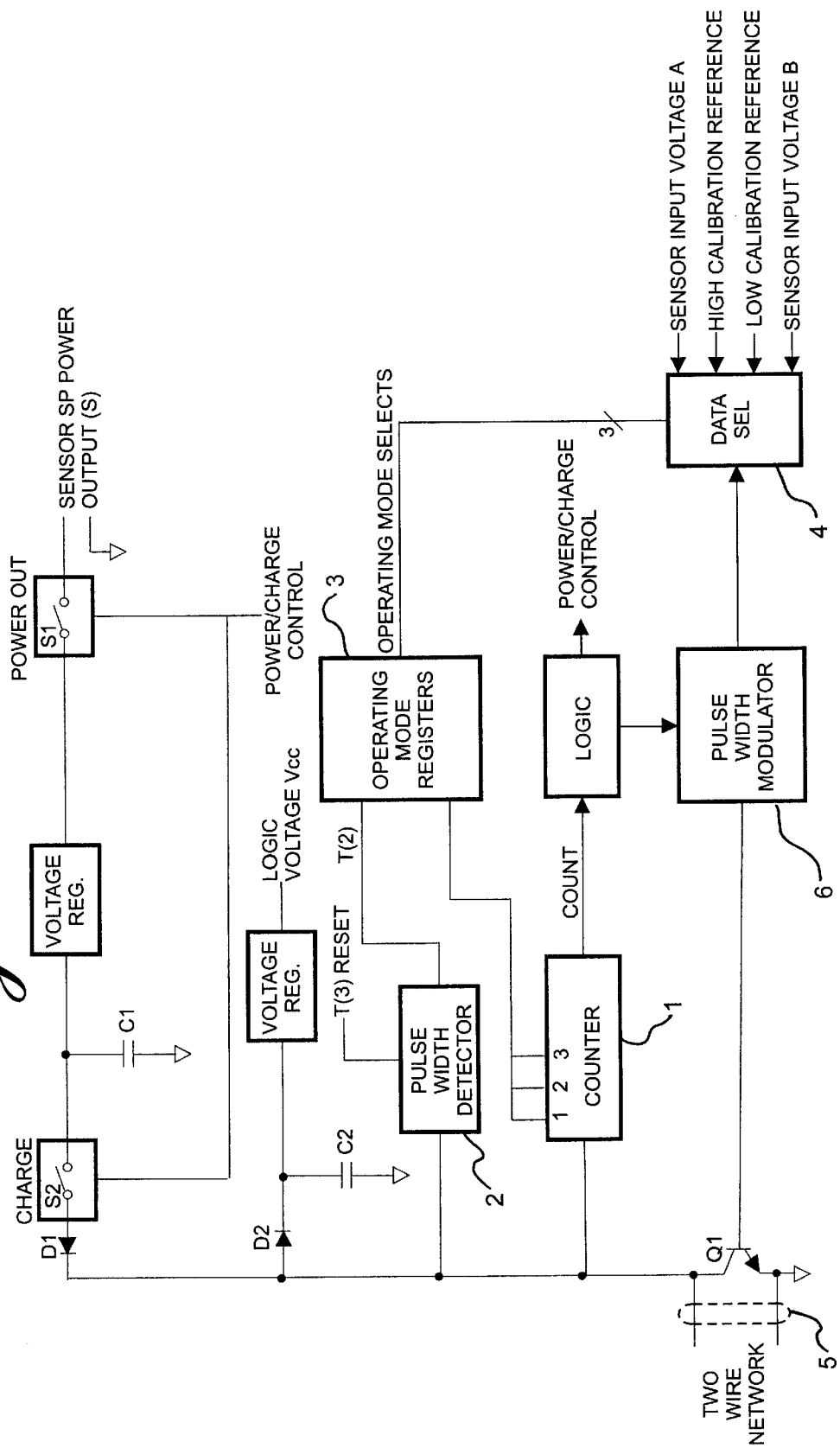
FIG. 6 is a block diagram of the remote unit (RU).

Referring to FIG. 1, the illustrated data collection/control system comprises a central unit 1 and a plurality of distributed remote units 2 to each one of which is connected sensors 3 and control devices 4. For the purposes of the following description it is assumed that there are twelve remote units (RU's) remotely located from the central unit (CU) in proximity to the sensors and control devices to reduce the network wiring task and each can serve two sensors or control devices. The RU's are connected to the CU with the two wire network 5. The RU's are wired in parallel to the two wire network with one of the wires combining signals and power and the other being ground. While this arrangement of twelve and two has been found convenient for design and standardization of manufacture, there is in principle no reason why other numbers of RU's with other numbers of sensors or controls could not be used.

FIG. 1 shows a multi-spur, multi-drop configuration of the network wiring formed by the CU and RU's. However, any routing of wiring is possible including loop wiring which allows fault tolerance to an open in the wiring network. Also, there is no restriction as to where the CU is connected in the network. For reasons that are obvious to those skilled in the art it is recognized that more than one CU can be connected to the network to allow CU fault tolerant redundance and/or separate location data display.

Primary power for the CU, RU's, and sensors is connected at the CU and consists of standard AC voltages and frequencies and/or backup power from an uninterruptable power source which may be external or internal to the CU.

The computer display 6 is used for purposes of mathematical manipulation, calculation of data transfer values, storage of calibration constants, and display of data transfers to or from the RU's via the CU. Although a computer is efficient for this application there is in principle no reason why a dedicated hardware or hybrid device such as an annunciator panel could not be adapted for this purpose. Also, although variable voltage data transfers are described there is in principle no reason why mechanical contact status could not replace sensor voltage inputs or control voltage outputs. In addition, one or more of the system features such as sensor power output or control voltage output may be deleted without compromising the embodiment of this invention or system performance.

FIG. 2 is an example of the network waveform protocol of the system depicted in FIG. 1. The principle of operation of the system is that, for each scan, the CU generates a stream of pulses that serve to set the network operating mode, provide a timing reference for pulsewidth modulated data transfers, and synchronize the system. The network waveform protocol also incorporates a source impedance/voltage amplitude plan which allows powering the RUs and sensors connected thereto.

This example comprises 12 RU's and utilizes 8 network operating modes. The network waveform consists of a sequence of CU initiated pulses according to a network protocol where all RU's act upon the first three pulses to establish a system operating mode region 1 (such as send data, receive data, send calibration voltage, etc.), a data transfer region 2 ordered by count to the individual RU's to multiplex (send) or demultiplex (receive) data representing voltage in pulsewidth modulated format using the CU timing reference pulsewidth, and system synchronization where the CU generated pulsewidth causes reset of all RU's regardless of state.

The waveform sequence is organized by count and fixed or variable pulsewidths. Pulses 1 through 3 are generated by the CU with one of two fixed pulsewidths, pulses 4 through 15 (12 RU's) are generated by the CU or RU's depending on operating mode and are variable width modulated pulses for data transfers representing voltage, and pulse 16 is generated by the CU at a third fixed pulsewidth for system synchronization.

The table of FIG. 2 delineates the CU and RU functions for each region of the network waveform that establishes a network protocol capable of adapting different operating modes for each sequence in a series of repeating pulse waveforms.

The illustrated example is efficient for demonstration of the invention. However, there is, in principle, no reason why other sequences structured to include or add different operating modes, group selects, pulsewidths, or number of pulses could not be used.

FIG. 2A details the pulsewidth modulated waveform in the operating mode region 1. Pulses #1 , #2 , and #3 are generated by the CU having a fixed pulsewidth of t(1) or t(2). The leading edge advances the RU count and the individual pulsewidth represents logic 0 for t(1) and logic 1 for t(2) pulsewidth. The pulse count is binary ranked to form a 3 bit coded serial waveform in the system operating mode region 1. This provides 8 different RU configuration controls. For example, the controls can be used to select the source or destination for transferred voltage data. The following table illustrates how pulses 2 and 3 may be t(1) or t(2) modulated to produce 4 operating modes for transferring voltage from two sensors and transferring two reference voltages for system calibration.

| Pulse 1 | Pulse 2 | Pulse 3 | NS Operating Mode |
| --- | --- | --- | --- |
| 0 | 0 | 0 | Select sensor input voltage A |
| 0 | 0 | 1 | Select high calibration reference |
| 0 | 1 | 0 | Select low calibration reference |
| 0 | 1 | 1 | Select sensor input voltage B |

FIG. 2B details the pulsewidth modulated waveform in the data transfer region 2. A single CU generated t(1) fixed width pulse 1 addresses each RU in count order where the leading edge advances the count and serves as a timing reference for pulsewidth modulation or demodulation. For data transfers from the RU's, the individual RU's modulate the t(l) pulse by extending it for an additional time proportional to sensor voltage 2 using the leading t(1) edge for timing reference. The result is a multiplexed variable pulsewidth 3 containing the RU address, data timing reference, and data transferred from the particular RU. For data transfers from the RU's, the NC converts the t(1) pulsewidth it generated from the wider multiplexed width modulated pulse and demodulates the result to a voltage proportional to the sensor voltage data transfer. Control voltage data transfers to the RU's from the CU utilize the same process but with reversed modulation and demodulation operations in the RU's and CU respectively.

FIG. 2 details the pulsewidth modulated waveform in the system synchronization region 3. It is the last waveform pulse generated by the CU and has a fixed t(3) pulsewidth which is different from all other waveform pulsewidths. The RU's are programmed to reset to a known starting state by this pulsewidth without regard to count or operating mode.

FIG. 3 details the network waveform architecture for providing electrical power to the RU's and supplying sensor power. The quiescent network voltage (+V) is higher than the sensor output voltage (Vsp) which is higher than the RU operating voltage (Vcc). This allows a voltage regulation region over which +V can vary without affecting Vsp and a further region over which Vsp can vary without affecting Vcc voltage levels. The CU power source supplies the +V network voltage via a switchable resistance that is changed by the CU from high to low at a satisfactory point midway in the pulse repetition interval (PRI) between all pulses of the waveform. This allows network signaling during the high resistance interval and RU power charging during the low resistance interval. The waveshape pulses are negative going from +V. This arrangement of a pulse signal polarity opposite to quiescent voltage polarity is basic in two wire DC network systems since the input impedance for RU power is low for positive voltages and thus represents a short circuit signaling path for like polarity architectures in practical systems. As will be explained later, the RU's are adapted to maintain operation during the negative polarity pulse periods.

FIG. 4 details the CU and RU network interface for pulsewidth modulated data transfer using the two wire network 5 to connect the CU 1 and RU's 2. Each incorporates an open collector output transistor Q1. The pull-up for In the bussed open collectors is the CU resistor R1 used for +V high resistance switching. This arrangement allows transistors Q1 of the CU and RU to be on at the same or different time without electrical conflict. Together, they jointly form the multiplex variable pulsewidth waveform used for sensor and control voltage data transfers. This open collector topology allows +V network voltage source resistance switching for signaling and RU power charging and allows use of a +V network voltage which is higher than Vsp or Vcc for reasons previously explained.

FIG. 5 is a block diagram illustrating operation of the CU in the two wire network 5. For ease of understanding, an electronic circuit approach is described although implementation may employ a firmware or software based controller. This invention deals with two way network data transfers. It is understood by those skilled in the art that reversing multiplex and demultiplex functions reverses the data direction so incorporating both in the CU and RU's provides bidirectional transfer. For reasons of simplification, only data transfers from the RU's to CU are discussed here.

The sequence generator 1 produces the 16 pulse t(1), t(2), and t(3) waveform at the desired frequency. It consists of an astable multivibrator 11 with fixed pulse width and duty cycle, a 4-bit counter 12, and two monostable multivibrators 13. The astable width is t(1) and the monostable circuits generate t(2) and t(3).

The sequence counter 2 is used to log the number of executed sequences for generation of the RU mode controls. It is an 'n' bit counter incremented by count 1 of the sequence generator. The block diagram illustrates operating mode changes for odd, even, the 16th, and 32nd sequence. System synchronization is accomplished by triggering the t(3) reset pulsewidth at count 16 in all sequences. The waveform sequence is formed by 'or' combination of the t(1), t(2), and t(3) pulses.

Pulse width demodulator 3 converts the RU multiplexed variable pulsewidth to a voltage proportional to their respective sensor voltage. The CU t(1) width is subtracted from the variable pulsewidth data transfer pulse and the remainder is converted to a DC voltage. An analog to digital converter (ADC) 4 formats the signal for output at the digital data interface 6 where address, operating mode, and data ready flag is added. The CU two wire network interface 7 has been previously described.

FIG. 6 is a block diagram illustrating operation of the RU in the two wire network 5. The counter 1 is 4 bit (16 counts) and is incremented on the negative edge of the t(1), t(2), or t(3) pulses. The pulse width detector 2 consists of detectors and outputs for pulse width t(2) for mode control and t(3) for reset. Counts 1, 2, and 3 are combined with the t(2) detector output to form set signals for the operating mode registers 3. With the previously defined pulsewidth logic and pulse count binary weighting, a 3 bit code is formed having 8 states for the operating mode region of the waveform sequence.

The data selector 4 inputs 1 of 4 sources to the pulse width modulator 6 to effect the configuration mode contained in the operating mode region The selected voltages are passed to the pulse width modulator 6 for linear conversion from voltage to pulsewidth for driving output transistor Q1. The operation of Q1 in formation of the data transfer pulsewidth is previously described.

The RU has local regulators to supply Vsp and Vcc at voltage levels shown in FIG. 3. Sensor power output is a applied when the RU is addressed and removed at termination of the data transfer pulsewidth by switch S1. S2 is switched on in the latter half of the PRI when the +V voltage source resistance is low and allowed to remain on for a fixed time ending before the next pulse to allow recharge of capacitor C1. Diodes D1 and D2 allow normal RU operation during negative pulse intervals. System power conservation can be achieved by incorporating a 'sleep mode' capability which allows counter power only until addressed and then applies power to the complete RU.

The present invention may be embodied in other specific forms without departing from the spirit or essential attributes thereof and accordingly, reference should be made to the appended claims rather than to the foregoing specification as indicating the scope of the invention.

What is claimed is:

1. A data acquisition system comprising:

a central unit;

a plurality of remote units located at positions remote from said central unit, each of said remote units including a condition response indicator adapted to output a voltage indicative of the condition sensed thereby;

means within said central unit for generating a pulse train comprised of a plurality of operating mode pulses and a plurality of address pulses, the number of address pulses being at least equal to the number of remote units with each address pulse being associated with a different one of said remote units;

a single pair of wires connecting said central unit to each of said remote units with all of said remote units being connected in parallel with each other;

each of said remote units including means for receiving its respective address pulse and including means for modifying the received pulse in accordance with the condition that it has sensed, and means within said central unit for analyzing the pulses as modified by said remote units.

2. The data acquisition system as claimed in claim 1 wherein said remote units modify said address pulses by changing the width thereof.

3. The data acquisition system as claimed in claim 2 wherein the amount of said change is proportional to said voltage indicative of the condition sensed.

4. The data acquisition system as claimed in claim 1 wherein one of said two wires functions as neutral and the other provides power to said remote units.

5. The data acquisition system as claimed in claim 4 wherein each of said remote units includes means for storing electrical energy from said pulses received from central unit in an amount sufficient to maintain operating voltage of said remote units.

6. The data acquisition system as claimed in claim 1 wherein said pulse train further includes a reset pulse.

7. The data acquisition system as claimed in claim 6 wherein said operating mode pulses are followed by said address pulses which, in turn, are followed by said reset pulse.

8. The data acquisition system as claimed in claim 1 wherein each of said remote units includes means for receiving and interpreting said operating mode pulses.

9. The data acquisition system as claimed in claim 8 further including means associated with at least some of said remote units for outputting a control signal in response to its address pulse following receipt of an appropriate operating mode pulse.

* * * * *